March 10, 1970     S. Y. MERRITT     3,500,168

SELF-DRIVEN INVERTER

Filed May 3, 1967

INVENTOR.
STANLEY Y. MERRITT

BY

HIS ATTORNEY

United States Patent Office 3,500,168
Patented Mar. 10, 1970

3,500,168
SELF-DRIVEN INVERTER
Stanley Y. Merritt, Waynesboro, Va., assignor to General Electric Company, a corporation of New York
Filed May 3, 1967, Ser. No. 635,788
Int. Cl. H02m 7/48
U.S. Cl. 321—18                                 4 Claims

ABSTRACT OF THE DISCLOSURE

An inverter of the saturating transformer type has its output supplied to a filter producing a sine wave at its output. To compensate for of leading current from the filter, a gap is provided in the transformer to increase its lagging magnetizing current. In order to maintain constant frequency, the input voltage is controlled by a series regulator comprising a main series transistor, normally biased on; an auxiliary transistor, normally biased off, and a magnetic amplifier, the control winding of which is energized from the output of the inverter.

BACKGROUND OF THE INVENTION

This invention relates to electrical conversion apparatus. More specifically it relates to regulated self-driven inverters.

Self-drive inverters are used in power supply systems to convert direct current into pulsating current. In the latter form, the current may be transformed to obtain desired voltage and current levels. Also, the output of such an inverter may be fed to wave-shaping means to produce desired wave-shapes.

A commonly used wave-shape is, of course, the sine wave provided to energize much electrical and electronic apparatus. This kind of apparatus is found in great quantity on modern aircraft. Ordinarily, the electrical energy for this equipment is provided by alternating current generators driven by the aircraft prime mover. If the prime mover should be shut down for any reason, as for instance, an emergency or prior to startup, then it may be desirable to supply the necessary alternating current energy from a direct current source such as a battery supply which may be aboard the aircraft or be connected thereto. It is in such a situation as this that the present invention can find particular utility.

While the self-driven inverter effectively converts direct current to alternating current and is therefore an appropriate device to use for the application described in the immediately preceding paragraph, there are some problems. One arises because the wave-shaper used to produce the necessary sine wave is essentially a filter using inductive and capacitive reactive components, so that the current from the filter is a leading current which may cause malfunctions of the inverter. Another problem arises because the output frequency of the inverter varies in response to changes in the supply voltage, which variations may be harmful to the equipment being supplied with electrical energy by the system.

SUMMARY OF THE INVENTION

It is therefore an object of this invention to provide an electrical conversion apparatus effective to produce a sine wave output without malfunctioning of the converter.

It is another object of this invention to provide an electrical conversion apparatus able to produce an output which is substantially constant in frequency and voltage.

It is a further object of this invention to provide a novel self-driven inverter effective without malfunctioning to supply a reactive load producing a leading current.

In accordance with the invention, a self-driven inverter utilizing semiconductor switching elements is provided with an output transformer constructed to increase the lagging current drawn thereby to offset any leading current produced by a load on the transformer secondary. In addition, the inverter is provided with a regulator in series between the source of supply voltage and the switching elements to hold its output frequency and voltage substantially constant.

BRIEF DESCRIPTION OF THE DRAWINGS

The specification concludes with claims particularly pointing out and distinctly claiming the subject matter which is regarded as the invention. An understanding of a specific embodiment of the invention may be derived from the following description taken in connection with the accompanying drawings in which:

DESCRIPTION OF A SPECIFIC EMBODIMENT

Figures 1, 2:
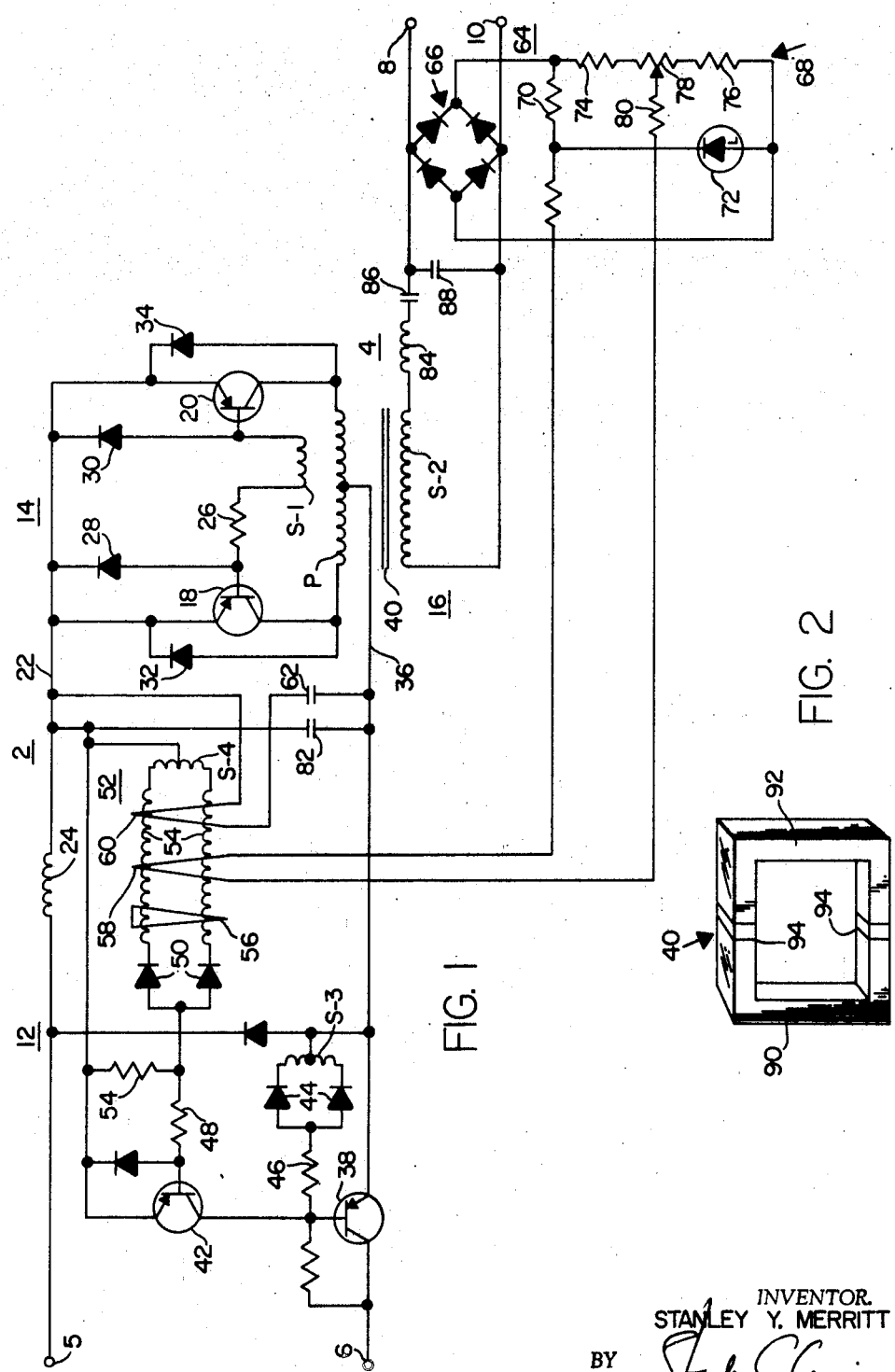
FIGURE 1 is a schematic illustration of apparatus embodying the invention.
FIGURE 2 is an illustration of the construction of a transformer core which may be used in the invention.

Referring to FIG. 1 of the drawing, the invention may be seen as being constituted by a self-driven inverter 2 supplying a wave-shaper 4. The inverter is arranged to convert the direct current energy delivered to a pair of input terminals 5 and 6 to an alternating current wave-shape which is essentially rectangular. The rectangular wave-shape in turn is modified by the wave-shaper 4 to produce at a pair of output terminals 8 and 10 a sine wave suitable for use by electrical or electronic apparatus such as radio gear, rotating machinery, etc.

The inverter 2 includes as its basic parts a regulating section 12, a switching section 14 and a transformer section 16. The switching section 14 includes a pair of semiconductor devices such as transistors 18 and 20. Each transistor has its emitter and collector circuit connected between an end of the primary P of the transformer 16 and a conductor 22 connected to the terminal 5 through an inductor 24. A secondary winding S-1 of the transformer 16 is connected directly to the base of the transistor 20 and through a resistor 26 to the base of the transistor 18. Each transistor, 18 and 20, has its base connected through diodes 28 and 30 respectively to the conductor 22 while diodes 32 and 34 are connected across the emitter and collector of each respective transistor. The transformer primary P has a center tap connected to a conductor 36 which in turn is connected through the emitter and collector circuit of a transistor 38 forming a part of the regulator section 12 to the terminal 6.

As is well known, the transistors 18 and 20 conduct alternately in a switching mode to provide for current flow from the center tap first in one direction, then in the other through the primary P from the conductor 36 to the conductor 22 thus producing alternatng current square waves on a secondary winding S-2 for utilization purposes.

In order to effect the switching action of the transistors 18 and 20; that is, first the conduction of one and then the conduction of the other, the transformer 16 is provided with a core 40 made of a material with a hysteresis curve approaching a square loop. If it is assumed that the transistor 18 is conducting, the current flow is to the right as illustrated in the drawing, primary P inducing a voltage in the secondary S-1. The secondary S-1 is wound on the core 40 in such a way with respect to the primary that the transistor 18 is biased on while the transistor 20 is biased off. When the core 40 approaches saturation, the induced voltage is reduced and the base drive to each transistor 18 and 20 is reduced. The transistor 18 now begins to turn off, reversing the direction of the current in the primary P. This causes a reversal of the voltage induced across secondary S-1 and transistor 20 now turns on as 18 turns off. The cycle then continues with the core 40 saturating in the other direction. The diodes 28 and 30 are provided so that there will be path for drive current bypassing the transistor which is not conducting. For example, when 18 is conducting, the right end of S–1 is positive. Current flows up through diode 30, down to the emitter of transistor 18, through resistor 26, and back to S–1. Transistor 18 is thus biased on by the current through its emitter base junction while transistor 20 is biased off by the voltage across diode 30. The diodes 32 and 34 are provided so that a path will be available for reactive current which bypasses transistors 18 and 20.

In order to hold the frequency and voltage output of the inverter substantially constant, the regulator section 12 includes the series transistor 38 and an auxiliary transistor 42. A voltage for normally biasing the transistor 38 is supplied by a secondary winding S–3 of the transformer 166 through a full wave rectifier 44 across a dropping resistor 46. The transistor 42 is normally biased off with its collector connected to the base of the transistor 38 and its emitter connected to the conductor 22. The base of the transistor 42 is connected through a resistor 48 to a pair of output diodes 50 of a magnetic amplifier 52. The junction of the diodes 50 and resistor 48 is connected through a resistor 54 to the conductor 22.

The magnetic amplifier 52 comprises a pair of main load windings 54 connected at one end to the diodes 50 and at the other end to a secondary winding S–4 of the transformer 16. A first stabilizing winding 56 is provided along with a control winding 58. A second stabilizing winding 60 is provided connected in series with a capacitor 62 across the conductors 36 and 22. The various windings of the magnetic amplifier 52 are wound on suitable cores in the manner well known in the art.

The control winding 58 of the magnetic amplifier 52 is energized by a direct current voltage produced by a feedback circuit 64. The feedback circuit comprises a full wave rectifier 66 connected across the output terminals 8 and 10 to derive a direct current voltage representative of the output of the wave-shaper 4. The voltage from the rectifier 66 is connected to the input terminals of a bridge 68 which includes a resistor 70 and a Zener diode 72 in series in one leg and resistors 74 and 76 in series with a potentiometer 78 in the other leg. One end of the control winding 58 is connected to an output terminal of the bridge 68 at the junction of the Zener diode 72 and resistor 70 while its other end its connected to the slider 80 of the potentiometer 78.

The direct current signal from the rectifier 66 is applied across the bridge 68. By virtue of the Zener action of the diode 72, the voltage at the junction between it and the resistor 70 is held constant. The voltage across the leg of the bridge 68 constituted by the resistors 74 and 76 and the potentiometer 78 varies as the output of the rectifier 66. To the extent that the voltage at the slider 80 is less than or more than the voltage at the juncion of 70 and 72, a current will flow in one direction or the other in the control winding 58 of the magnetic amplifier 52. If the output voltage of the inverter should increase above or decrease below a value determined by the characteristic of the Zener diode 72, a current will flow in the control winding 58 to vary the output of the magnetic amplifier 52. If the inverter output voltage is excessive, the magnetic amplifier output will change so as to bias the transistor 42 on. As the transistor 42 turns on the series transistor 38 is turned off removing the voltage applied to the switching section 14 and consequently the output voltage. In the normal operation of the circuit, the transistor 38 is maintained on until the desired operating voltage level is reached. At this level, the transistor 38 is turned off and on by the action of the transistor 42 in order to maintain the average voltage at the desired operating level. If the output voltage falls below the values determined by the characteristic of the Zener diode 72, the opposite effects occur. Thus by controlling conduction of the transistor 38 in a time ratio fashion there is provided a regulating function to maintain the voltage supplied to the inverter substantially constant and therefore its output voltage and frequency.

Additional control and protection is provided by the stabilizing winding 60 which by virtue of its connection to the capacitor 52 may respond to any voltage surges at the terminals 5 and 6 to control the magnetic amplifier in the appropriate direction. The inductor 24 in conjunction with a capacitor 82 acts to filter the applied direct current in accordance with conventional practice.

The square wave output of the inverter includes a corresponding square wave in the secondary winding S–2 of the transformer 16. This square wave is shaped by the wave-shaper 4 consisting of a series inductor 84, a series capacitor 86 and a shunt capacitor 88. These reactive elements act shape the voltage applied thereto so as to produce substantially a sine wave at the terminals 6 and 10.

The effect of the reactance of the wave-shaper 4 is to produce a leading current. Under no-load conditions the current in the transformer primary P is a lagging current as would be expected in an inductive device of that nature. In such a mode of operation, if the transistor 18 were conducting and creased to conduct at the end of the half cycle as the transformer saturated, the current continuing to flow would flow through the diode 34 to the conductor 22 to aid in the turn on the transistor 20. If as in the illustrated embodiment, the load is such that the current leads, then at the end of a half cycle where 18 conducts, the current flow in the primary P is to the left through the diode 32, thus preventing the turnoff of the transistor 18. In order to eliminate this kind of malfunction, the invention contemplates that the transformer 16 may be constructed to increase the lagging magnetizing current drawn by the transformer. This may be done by providing an intentional air gap in the transformer 16. The gap is dimensioned so that the magnetizing current drawn by the transformer offsets the leading current from the filter.

FIGURE 2 illustrates how the core 40 of the transformer may be constructed to provide the desired air gap. The core illustrated comprises a pair of C-shaped portions 90 and 92 rectangular in cross section and built up from a plurality of laminates. Each end of a C-shaped portion opposes the end of another C-shaped portion and is spaced therefrom. The spacings between the ends constitute the "air gap" and to provide for mechanical strength, they may be occupied by non-magnetic inserts 94 of some suitable plastic material thus increasing the magnetic reluctance of the core so as to increase the magnetizing current of the transformer. As stated above, this air gap is dimensioned for each inverter design so that the lagging current of the transformer offsets the leading current of the wave-shaper.

This arrangement therefore is one which particularly adapts a self-driven inverter to supply a reactive load with a voltage of substantially constant frequency and magnitude.

Although a specific embodiment of the invention has been illustrated and described, the invention is not to be limited to such embodiment for it is intended that the appended claims cover all modifications within the spirit and scope of the invention.

What is claimed as new and desired to be secured by Letters Patent of the United States is:

1. In a self driven high power converter including two means for connection to a source of direct current voltage, a transformer including a core with a substantially square loop situation characteristic connected to one of said means, a pair of semi-conductor switching elements connected between the primary winding of the transformer and the other of said means the said transformer having a secondary winding connected to the control means of the switching elements to conduct alternately, the improvement comprising:
(a) a wave shaping circuit which produces a leading output current
(b) a secondary winding provided on the transformer and connected to said wave shaping circuit,
(c) the core of said transformer having an air gap therein to produce a lagging current, the air gap on said core being dimensioned so that the magnetizing current drawn by the transformer offsets the leading current from the wave shaping circuit, and
(d) a switching regulator interposed between the primary winding of the transformer and the one of said means for connection to hold the voltage applied to the switching elements substantially constant.

2. The combination of claim 1 wherein said regulator comprises a first transistor connected in series between said means for connection and said transformer primary, means for normally biasing said transistor into one conducting state, a second transistor connected to a control element of said first transistor to control the conduction thereof and normally biased to be in a non-conducting state and means to control the conduction of said second transistor and to switch it into the conducting state whenever the output voltage of the converter, exceeds a predetermined level to effect thereby a time ratio control of the direct current voltage applied to said regulator.

3. The combination of claim 2 wherein said last-mentioned means includes a magnetic amplifier having its output connected to a control element of said second transistor, the transformer having a secondary connected to supply said magnetic amplifier, a control winding on said magnetic amplifier, means for producing a signal representative of the variations in the output of the inverter, and means for coupling said signal to said control winding.

4. The combination of claim 1 wherein said air gap is constituted by inserts of a nonmagnetic material in said core.

References Cited

UNITED STATES PATENTS

| | | | |
|---|---|---|---|
| 3,237,081 | 2/1966 | Martin | 321—18 |
| 3,270,269 | 8/1966 | Low | 321—18 XR |
| 3,305,756 | 2/1967 | Doss et al. | 321—18 XR |
| 3,311,807 | 3/1967 | Rodaer | 321—18 |
| 3,319,180 | 5/1967 | Mesenhimer | 331—47 |
| 3,327,199 | 6/1967 | Gardner et al. | 321—18 XR |
| 3,365,650 | 1/1968 | Camp et al. | 321—18 |
| 3,369,195 | 2/1968 | Zollinger et al. | 321—18 XR |

LEE T. HIX, Primary Examiner

W. M. SHOOP, JR., Assistant Examiner

U.S. Cl. X.R.

321—21